US010428999B2

(12) United States Patent
Hsu et al.

(10) Patent No.: US 10,428,999 B2
(45) Date of Patent: Oct. 1, 2019

(54) LIFT MECHANISM AND THIN-TYPE SUPPORTING DEVICE UTILIZING THE SAME

(71) Applicant: Jarllytec Co., Ltd., New Taipei (TW)

(72) Inventors: Po-Han Hsu, New Taipei (TW); Sheng-Hsiang Huang, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 162 days.

(21) Appl. No.: 15/695,860

(22) Filed: Sep. 5, 2017

(65) Prior Publication Data

US 2018/0112816 A1    Apr. 26, 2018

(30) Foreign Application Priority Data

Oct. 21, 2016 (TW) .............................. 105216153 U

(51) Int. Cl.
  F16M 11/10    (2006.01)
  F16M 11/24    (2006.01)
  F16M 13/02    (2006.01)
  F16C 29/04    (2006.01)
  F16C 33/36    (2006.01)

(52) U.S. Cl.
  CPC .............. F16M 11/24 (2013.01); F16M 11/10 (2013.01); F16M 13/02 (2013.01); *F16C 29/04* (2013.01); *F16C 33/363* (2013.01); *F16M 2200/048* (2013.01); *F16M 2200/08* (2013.01)

(58) Field of Classification Search
  CPC ......... F16M 11/24; F16M 13/02; F16C 29/04; F16C 33/363
  See application file for complete search history.

(56) References Cited

U.S. PATENT DOCUMENTS

| 7,413,150 | B1 * | 8/2008 | Hsu ........................ | F16M 11/10 248/123.11 |
| 7,789,355 | B2 * | 9/2010 | Gan ...................... | F16M 11/105 248/157 |
| 9,279,537 | B2 * | 3/2016 | Hung ...................... | F16M 11/18 |
| 9,976,691 | B2 * | 5/2018 | Chin ...................... | F16M 11/22 |

(Continued)

FOREIGN PATENT DOCUMENTS

TW         M527198 U     8/2016

*Primary Examiner* — Tan Le
(74) *Attorney, Agent, or Firm* — Muncy, Geissler, Olds & Lowe, PC

(57) ABSTRACT

A lift mechanism, comprising: a post, two sliding elements, and a constant force spring. One sliding element supports a display and has a rolling member for rolling contacting a post side of the post. Another sliding element is provided at another post side and fixed with the other sliding element across the post body by a connecting structure, so that the two sliding elements pulling each other slide coherently along the two post sides. The constant force spring is provided at one post end of the post and extends an end fixed to the connecting structure to stop the two sliding elements. A thin-type supporting device comprises the lift mechanism and a flat-shaped support. A post is fixed with two post ends to inner walls of the flat-shaped support, so that the sliding element connected with the display slides along a longitudinal long hole on the flat-shaped support.

14 Claims, 11 Drawing Sheets

(56) References Cited

U.S. PATENT DOCUMENTS

2004/0118984 A1* 6/2004 Kim .................... F16C 11/0619
248/149
2009/0090895 A1* 4/2009 Hogan, Jr. ............. A01G 9/022
254/266
2016/0001119 A1* 1/2016 Jue ..................... A63B 69/0064
482/54

* cited by examiner

US 10,428,999 B2

LIFT MECHANISM AND THIN-TYPE SUPPORTING DEVICE UTILIZING THE SAME

FIELD OF THE INVENTION

The present invention relates to a supporting device, and more particular to a thin-type supporting device applicable for connecting and supporting a display, and the display carried by the thin-type supporting device is lifted up and down by the lift mechanism of the thin-type supporting device.

BACKGROUND OF THE INVENTION

Due to the technological progress of nowadays display, the display of the same diagonal panel length becomes thinner than ever before. In order to meet the thin and light display structure and to reduce the thick appearance, the design of the conventional support structure is modified accordingly by technical means of reducing using metal casting pieces or avoiding one-piece casting to achieve effective space utilization and reducing the width/thickness of the structure, such as the present applicant applied for a "lifting device" (Taiwan utility model patent M527198) comprising a support (1), the support (1) comprising an upper frame (11) having a pair of rail grooves (111) on the opposite left and right sides thereof, and a through groove (112) provided in front of each of the pair of rail grooves (111) a seat (2) having a seat plate (21) having a rear end extending vertically to a pair of wings (23), the left and right sides of the pair of wings (23) provided symmetrically with a pair of slide seats (231) sat in the pair of rail grooves (111), each of the slide seats (231) provided with plural roller holes (232) arranged in two rows and communicating with one of adjacent side walls of the slide seats (231), at least one of the roller holes (232) in each row of the roller holes (232) provided with a roller (233), so that each of the rollers (233) partially exposed to the adjacent side walls of each of the slide seats (231) and adjacent to a respective inner walls of the respective rail grooves (111), and a end tab (234) engaged to the slide seats (231) to enclose the two rows of wheel holes (232), and the pair of wings (23) provided through the pair of through grooves (112); and a constant force spring (3) coiled in a loop connected between the upper frame (11) and the seat (2).

However, the present applicant has neglected the display viewing from the viewpoint of a user, and therefore the abovementioned support (1) has a structural width/thickness at the viewpoint. Moreover, the lower frame (12) of the support (1) use metal casting pieces. Thus, to find the technical means of further reducing using metal casting pieces or avoiding one-piece casting in the overall design of the support and the technical means of a thinner appearance of the display viewing from the viewpoint of a user are the problems to be solved by the present invention.

SUMMARY OF THE INVENTION

One object of the present invention is to provide a lift mechanism. By providing two sliding elements that pull each other slide respectively along at least two post sides of a post to the lift mechanism, the overall volume can be reduced, and the two sliding elements can move coherently along the at least two post sides of the post, respectively. Besides, by providing a constant force spring to a post end of the post, the two sliding elements are pulled to stop the movement. Furthermore, by supporting a display with one of the sliding elements, the lift mechanism is thinned in the viewpoint from the display.

Another object of the present invention is to provide a thin-type supporting device having a lift mechanism. By providing a flat-shaped support to the supporting device, the lift mechanism is received and protected therein. The flat-shaped support comprises a case formed by bending two long side plates of the same width and a short top plate made of extruded aluminum. Plural long and short connecting pieces connect between the case and the post for strengthening the structure, so that the assembled flat-shaped support has improved structure strength, and thereby reducing the number of casting components to maintain the thinning effect.

To reach the objects stated above, the technical scheme to implement present invention is a lift mechanism for lifting a display up and down, and the lift mechanism comprises: a post, having a post body between two post ends thereof; a first sliding element for supporting the display, one side of the first sliding element provided with at least one first rolling member for rolling contacting a post side of the post body; a second sliding element, provided at another post side of the post body and connected and fixed to the first sliding element across the post body by at least one connecting structure, so that the two sliding elements that pull each other slide respectively along at least two post sides of the post body and move coherently; and a constant force spring, provided at one post end of the post body and extending an end to connect and fix to the at least one connecting structure, so that the two sliding elements that move coherently are stopped by a default elastic force.

To reach the objects stated above, the technical scheme to implement present invention is a thin-type supporting device having a lift mechanism, wherein the lift mechanism thereof is for lifting a display up and down, and the thin-type supporting device comprises: a flat-shaped support provided with a longitudinal long hole on a narrow side of the flat frame for communicating with a receiving space in the flat-shaped support; a post fixed to two opposite end parts of the receiving space respectively with its two post ends, so that a post body of the post forms a central post; a first sliding element for supporting the display, one side of the first sliding element provided with at least one first rolling member for rolling contacting a post side of the post body, and the first sliding element traversing through and sliding along the longitudinal long hole; a second sliding element, provided at an opposite another post side of the post body and connected and fixed to the first sliding element across the post body by at least one connecting structure, so that the two sliding elements that pull each other slide respectively along at least two post sides of the post body and move coherently; and a constant force spring, provided at one post end of the post body and extending an end to connect and fix to the at least one connecting structure, so that the two sliding elements that move coherently are stopped by a default elastic force.

The present invention will be understood more fully by reference to the detailed description below.

DETAILED DESCRIPTIONS OF PREFERRED EMBODIMENTS

Figure 10:
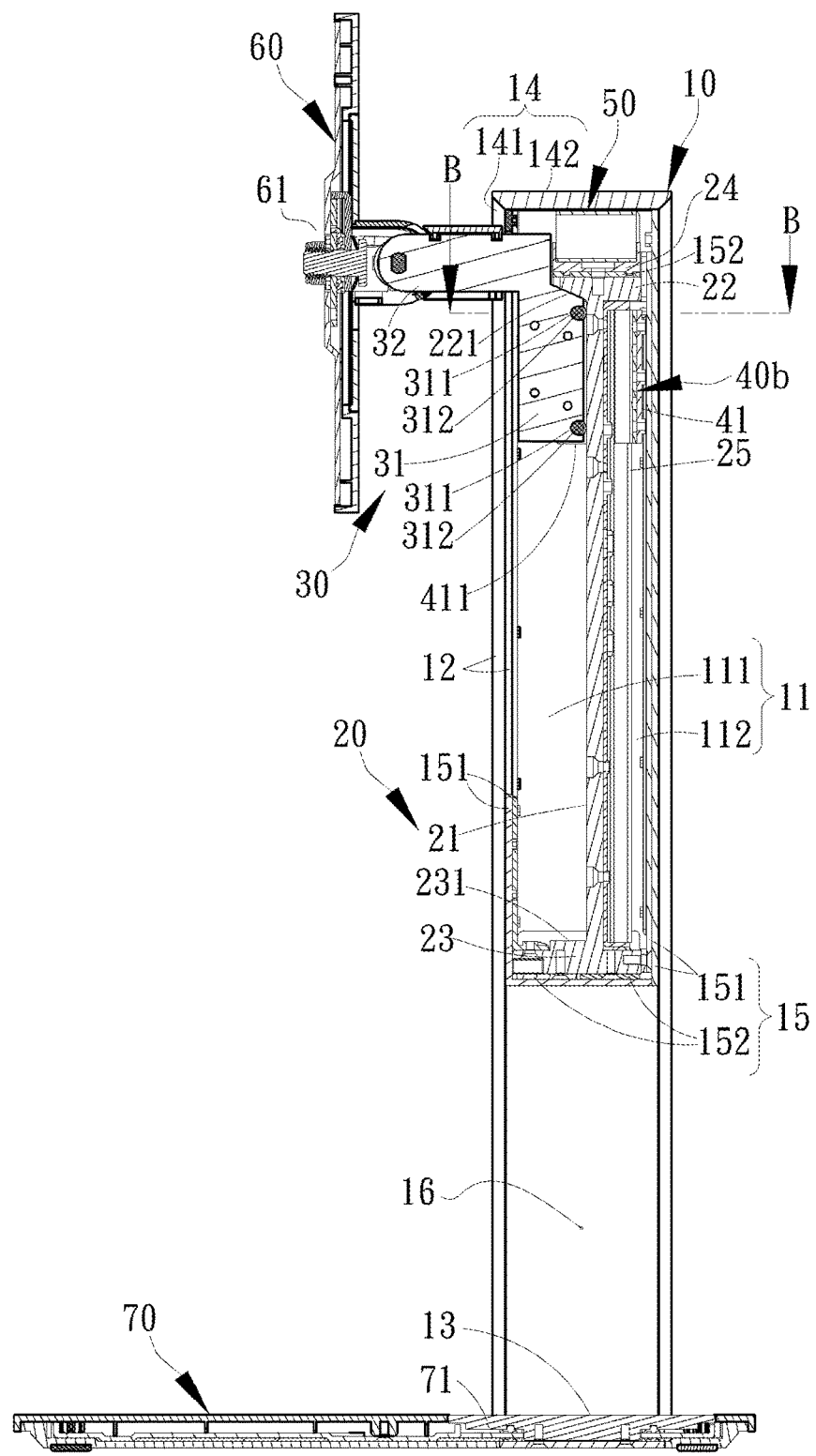
FIG. 10 is an exploded view of the thin-type supporting device provided by the present invention.

The present invention is a lift mechanism and a thin-type supporting device having a lift mechanism, in which the lift mechanism can directly support a display (not shown in the figures, which is not reminded in the follow-up description for the convenience of illustration) or indirectly support the display by a bearing seat (see FIG. 10) to lift the display up and down. Please refer to FIGS. 1 to 7 for embodiments of the lift mechanism. The thin-type supporting device having a lift mechanism provided by the present invention can be used to connect and support a display, and the display can be lifted up and down by the lift mechanism of the thin-type supporting device. Please refer to FIGS. 8 to 11 for embodiments of the thin-type supporting device. The two types of embodiments are illustrated below.

As shown in FIGS. 1 to 7, the lift mechanism comprises a post 20, a first sliding element 30, a second sliding element 40a, 40b, 40c and a constant force spring 50. A post body 21 is between two post ends of the post 20. A first sliding element 30 is for supporting the display and at least one first rolling member 312 (e.g., a roller or a ball) is provided on one side of the first sliding element 30 for rolling contacting a post side of the post body 21. The second sliding elements 40a, 40b, 40c are provided at another post side of the post body 21 and connected and fixed to the first sliding element 30 across the post body 21 by at least one connecting structure 411, so that the two sliding elements that pull each other slide respectively along at least two post sides of the post body 21 and move coherently. The constant force spring 50 is provided at one post end of the post body 21 and extending an end to connect and fix to the at least one connecting structure 411, so that the two sliding elements that move coherently are stopped by a default elastic force.

In the abovementioned lift mechanism, the combination of the first sliding element 30, the second sliding element 40a, 40b, 40c, and the constant force spring 50 is provided to simplify the entire lift mechanism and to reduce the overall volume. The two sliding elements are provided on at least two post sides of the post body 21 and are pulled each other to stably move coherently and share the load. While the first sliding element 30 is used to support a display, the load on the first sliding element 30 is therefore greater. In order to avoid the occurrence of the conventional derailment of the slide rail components, for example, the movable track or fixed track of the slide rail of balls is deformed by an external force and disengaged from each other, the sliding element 30 is integrally formed and is provided with at least one first rolling member 312 (e.g., a roller or a ball) between the first sliding element 30 and one post side of the post body 21 so as to slide by means of rolling contact. The at least one first rolling member 312 further comprises plural first rolling members 312 spaced apart to share the load and to balance the support, thereby facilitating the effect of rolling contact.

In order to have a thinned image viewing from the viewpoint of the display, the lift mechanism is conformed flat-shaped in the structural design, and therefore the first sliding element 30 is designed to have a flat-shaped structure, and the first sliding element 30 and the second sliding elements 40a, 40b, 40c are disposed on opposite post sides of the post body 21, respectively. The first sliding element 30 comprises a block structure 31 and a bearing arm structure 32 connected with each other as an integral. The bearing arm structure 32 extends toward the direction away from the post 20 for directly supporting the display or indirectly supporting the display by a bearing seat (see element label 60 in FIG. 8). The block structure 31 has a narrow side facing the post body 21 of the post 20, and the narrow side is provided with at least one groove 311 for disposing the at least one first rolling member 312, thereby limiting the position and reducing loosening or disengagement from each other. The at least one groove 311 further comprises plural spaced-apart grooves 311, each of which is configured with plural first rolling members 312.

Since the first sliding element 30 is flap-shaped, the block structure 31 is provided with two opposite wide sides. For not being effected by the shape of the structure, so that the two sliding elements that pull each other can stay close to the two post sides of the post body 21 without offsetting during the coherent movement, a terrace 313 rises on each of the wide sides of the block structure 31, and the second sliding elements 40a, 40b, 40c are provided with a detachable engaging piece 41, the at least one connecting structure 411 are two connecting wings bending respectively from two opposite sides of the engaging piece 41, and each of the at least one connecting structure 411 crosses the post body 21 to connect and fix respectively to one of the terraces 313 of the block structure 31, which can not only protect the second sliding elements 40a, 40b, 40c, but also fix the first sliding element 30 to the terraces 313 on the two opposite wide sides of the block structure 31 to form a clamp. Moreover, the components surround the post body 21 to prevent inclination, in order to facilitate the stability of the action.

In the case of the constant force spring 50, since it adopt a volute spring (or coiled spring) structure, which has a width and is formed by winding a stripe of thin spring leaf with one wide segment of the thin spring leaf exposed. A spring retainer 24 is provided to one post end of the post 20 for receiving the constant force spring 50. In order to conform to the thin-type structural design, one end 51 of the constant force spring 50 and one terrace 313 of the block structure 31 are connected and fixed respectively to two opposite faces of one of the connecting structure 411 (one connecting wing of the engaging piece 41), a fixing piece 42 is provided to clamp the end 51 of the constant force spring 50 with the connecting structure 411.

In order to limit the lifting range of the two sliding elements on the at least two post sides of the post body 21, the two opposite post ends of the post 20 respectively form a first beam 22 and a second beam 23 so that the post 20 can have any one of: a "⊥" shape, a "⊥" shape, a "⊓" shape, a "⊏" shape, and a related shape, so that one side of the block structure 31 contacts an inclined plane of the first beam 22 to stop moving up, or the other side of the block structure 31 contacts an stage 231 of the second beam 23 to stop moving down.

Figure 1:
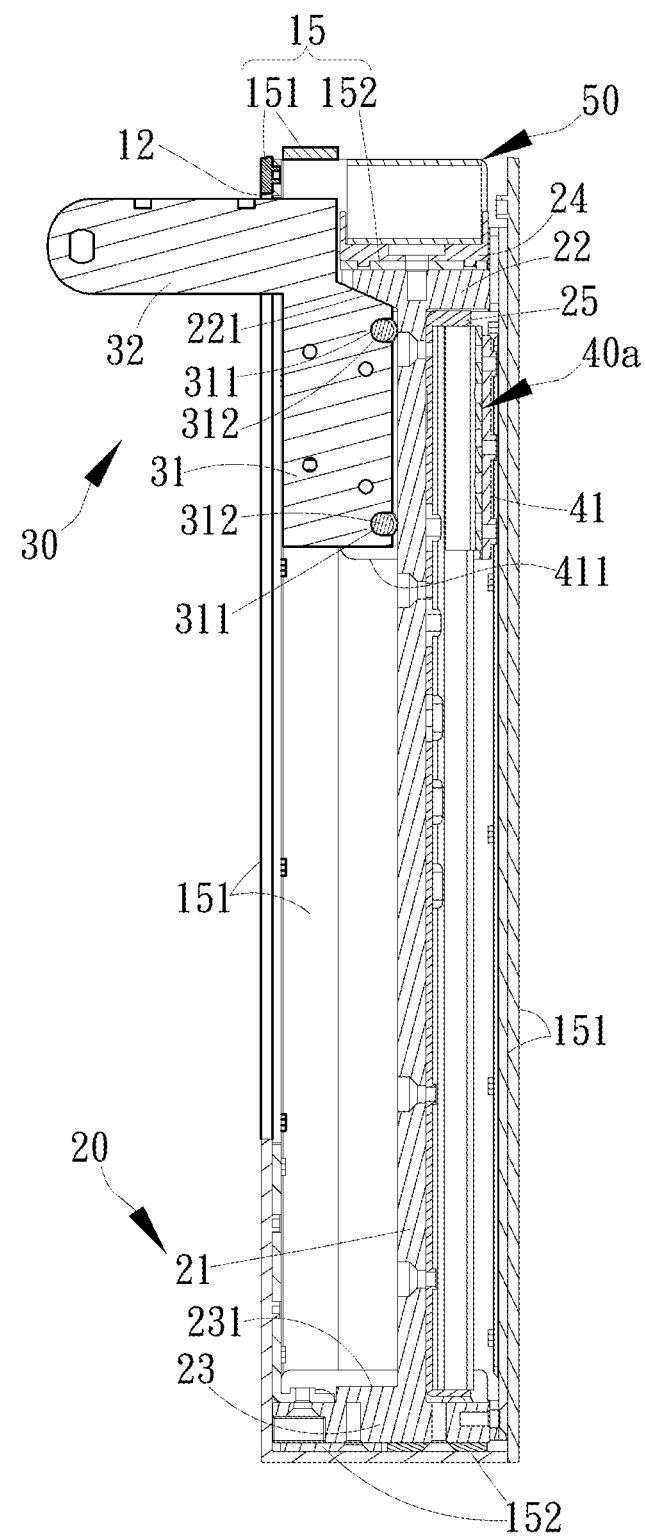
FIG. 1 is a cross-sectional side view of the lift mechanism provided by the present invention.
Figure 2:
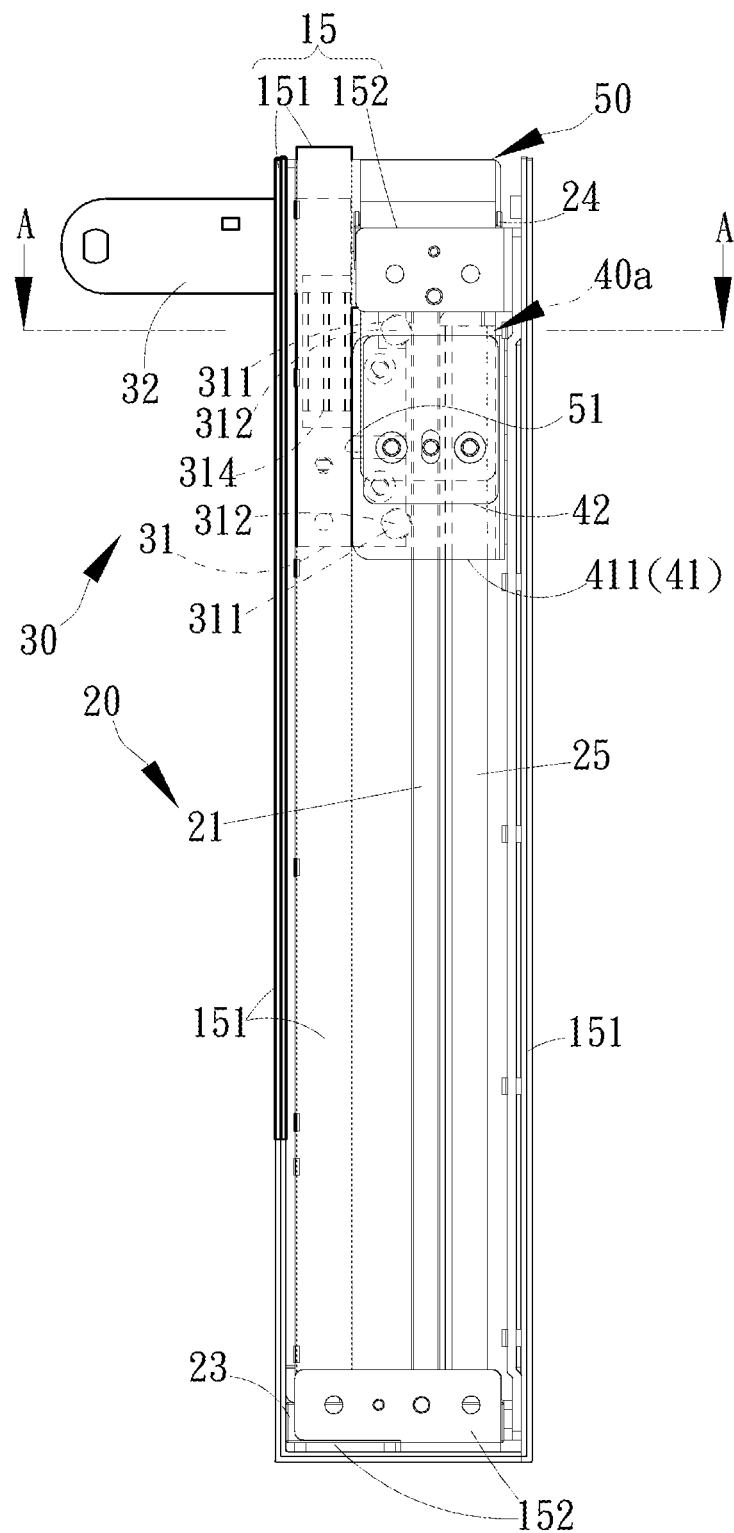
FIG. 2 is a side view of the lift mechanism provided by the present invention. The two sliding elements are covered

Moreover, in order to protect and prevent the abovementioned post 20, the first and second sliding elements 30, 40a. 40b, 40c and the constant force spring 50 loosened or disengaged, on the basis of the above-mentioned structure elements, the lift mechanism further comprises: a flat frame 15 engaged by plural long and short connecting pieces 151, 152, which are made by stamping. The long connecting pieces 151 bridge across longitudinally and the short connecting pieces 152 line alongside transversely and through positioning and locking structure (such as tenon/latch and tenon hole, or skew and threaded hole, in which the skew is not shown in the figures) to fixed to the two opposite post ends (i.e., the first and second beams 22, 23) of the post 20, so that the two opposite sides of the formed flat frame 15 are narrow sides and the other two opposite sides are wide sides. As the post 20 connects and fixed to the two opposite end parts of the flat frame 15 respectively through the first beam 22 and the second beam 23 on the two opposite post ends, the post body 21 of the post 20 forms the central post within the flat frame 15. Each of the two opposite wide sides of the first sliding element 30 is provided with an adjustable friction member 314 to respectively butt against and frictionally contact a long connecting piece 151 at each of wide sides of the flat frame 15. The pair of long connecting pieces 151 as shown in FIGS. 1 and 2 can be used optionally with the pair of friction members 314 and therefore can be assembled or disassembled accordingly. The first sliding element 30 traverses through and sliding along a longitudinal long hole 12 on a narrow side of the flat frame 15, in which the longitudinal long hole 12 is formed in at least one long connecting piece 151 on the narrow side of the flat frame 15. Accordingly, besides guiding the bearing arm structure 32 through the longitudinal long hole 12 of the flat frame 15, each of the adjustable friction members can be adjusted to tightly or loosely butt against a long connecting piece 151 at each of wide sides of the flat frame 15, so that an auxiliary friction produced accordingly compensates the friction between the at least one first rolling member 312 and the post body 21 and further share the load on the at least one first rolling member 312, thereby stabilizing the up and down movement of the two sliding elements along the post body 21.

Moreover, as shown in FIGS. 8 to 11, the present invention also provides a thin-type supporting device having a lift mechanism, which on basis of the abovementioned post 20, the first sliding element 30, the second sliding elements 40a, 40b, 40c, and the constant force spring 50 further comprises a flat-shaped support 10 having two opposite narrow sides and the other two opposite wide sides to form a thin-shape and for shielding the aforementioned structure elements and enhancing the protection function. The difference between the thin-type supporting device and the lift mechanism is characterized in that a narrow side of the flat-shaped support 10 is provided with a longitudinal long hole 12 for communicating with a receiving space 11 in the flat-shaped support 10. The post 20 is fixed to two opposite end parts of the receiving space 11 respectively with its two post ends, so that the post body 21 of the post 20 forms a central post, and the two sliding elements are provided respectively at the two opposite sides of the post body 21. Accordingly, the two sliding elements that pulled each other in the flat-shaped support 10 slide respectively along the two post sides of the post body 21 and move coherently, and the two sliding elements can be stopped by the constant force spring 50.

In the abovementioned thin-type supporting device, two longitudinal channels 111, 112 are partitioned from the receiving space 11 defined by the post body 21 of the post 20. The first sliding element 30 is provided in one of the longitudinal channels 111, and the second sliding element 40a, 40b, 40c is provided in the other longitudinal channel 112 at the opposite post side of the post body 21. Two interstices 113, 114 are formed respectively between another two opposite post sides of the post body 21 and each of inner walls of wide sides of the flat-shaped support 10 for the at least one connecting structure 411 and one end of the constant force spring 50 to traverse through. Accordingly, the abovementioned thin-shape structural design is favorable to the movement of the two sliding elements and the structural elements connected therewith.

Next, the flat-shaped support 10 further comprises a base plate 13, a case 14, and plural long and short connecting pieces 151, 152, the long connecting pieces 151 and short connecting pieces 152 longitudinally bridge across and transversely line alongside the two opposite post ends of the post 20 and each of which are fixed to inner walls of the case 14, so that the receiving space 11 is formed in an upper part of the flat-shaped support 10. The case 14 is formed by bending two long side plates 141 of the same width and a short top plate 142 made of extruded aluminum in a "⊓" shape, and the case 14 is provided across the base plate 13 with the two long side plates 141 and forms an opening 16 at a lower part of the flat-shaped support 10. The flat-shaped support 10 further comprises a supporting plate 60 and a base 70. A positioning groove 71 is provided on a top of the base 70 for embedding the base plate 13 to make the flat-shaped support 10 stand. One side of the supporting plate 60 supports the display, and an opposite side of the supporting plate 60 pin connects the bearing arm structure 32 of the first sliding element 30 by a hinge device 61, so that the display can be adjusted to tilt forward or backward when being lifted up and down. On each of the contact faces of the long and short connecting pieces 151, 152 to the post 20 and the inner walls of the case 14 and each of the contact faces of the case 14 to the base plate 13 are provided with corresponding positioning and locking structure (such as tenon/latch and tenon hole, or skew and threaded hole) for the convenience of being assembled or disassembled. The long and short connecting pieces 151, 152 are not only for connecting between the case 14 and the post 20, but also for strengthening the structure of the flat-shaped support 10 in combination with the post 20.

As for the other features, for example, the first sliding element 30 is flat-shaped and comprises a block structure 31 and a bearing arm structure 32 connected with each other as an integral. The bearing arm structure 32 traverses through and slides along the longitudinal long hole 12, and the block structure 31 has a narrow side facing the post body 21 of the post 20. The narrow side is provided with a groove 311 for disposing the at least one first rolling member 312. The first sliding element 30 has two opposite wide sides on its block structure 31, a terrace 313 rises on each of the wide sides respectively, and each of the wide sides is provided with an adjustable friction member 314, and the second sliding element 40a, 40b, 40c is provided with a detachable engaging piece 41, the at least one connecting structure 411 are two connecting wings bending respectively from two opposite sides of the engaging piece 41, and each of the at least one connecting structure 411 crosses the interstices 113, 114 of the post body 21 to connect and fix respectively to one of the terraces 313 of the block structure 31 of the first sliding element 30, and each of the friction member 314 directly butts against and frictionally contacts the inner walls of the wide sides of the flat-shaped support 10 respectively to produce auxiliary friction for compensation. One post end of the post 20 is provided with a spring retainer 24 for receiving the constant force spring 50. One end 51 of the constant force spring 50 and one terrace 313 of the block structure 31 of the first sliding element 30 are connected and fixed respectively to two opposite faces of one of the connecting structure 411. A fixing piece 42 is provided to clamp the end 51 of the constant force spring 50 with the connecting structure 411, which are the technical features of the lift mechanism described above. The function and effect of the structural design is also similar to the aforementioned lift mechanism described above and thus is not described in detail herein.

Figure 3:
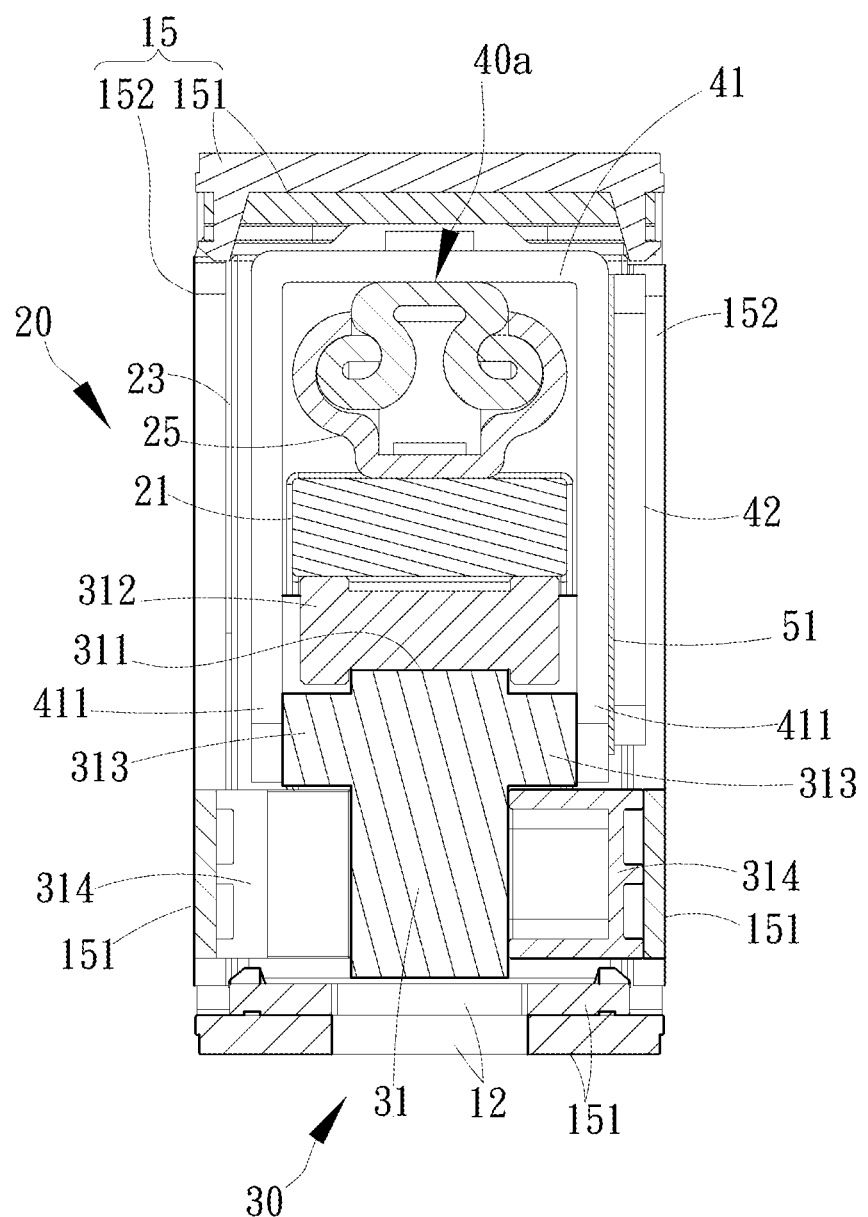
FIG. 3 is a cross-sectional top view along line AA' in FIG. 2. The second sliding element is a slide rail without a rolling part in coordination with a track in the post body of the post.
Figure 4:
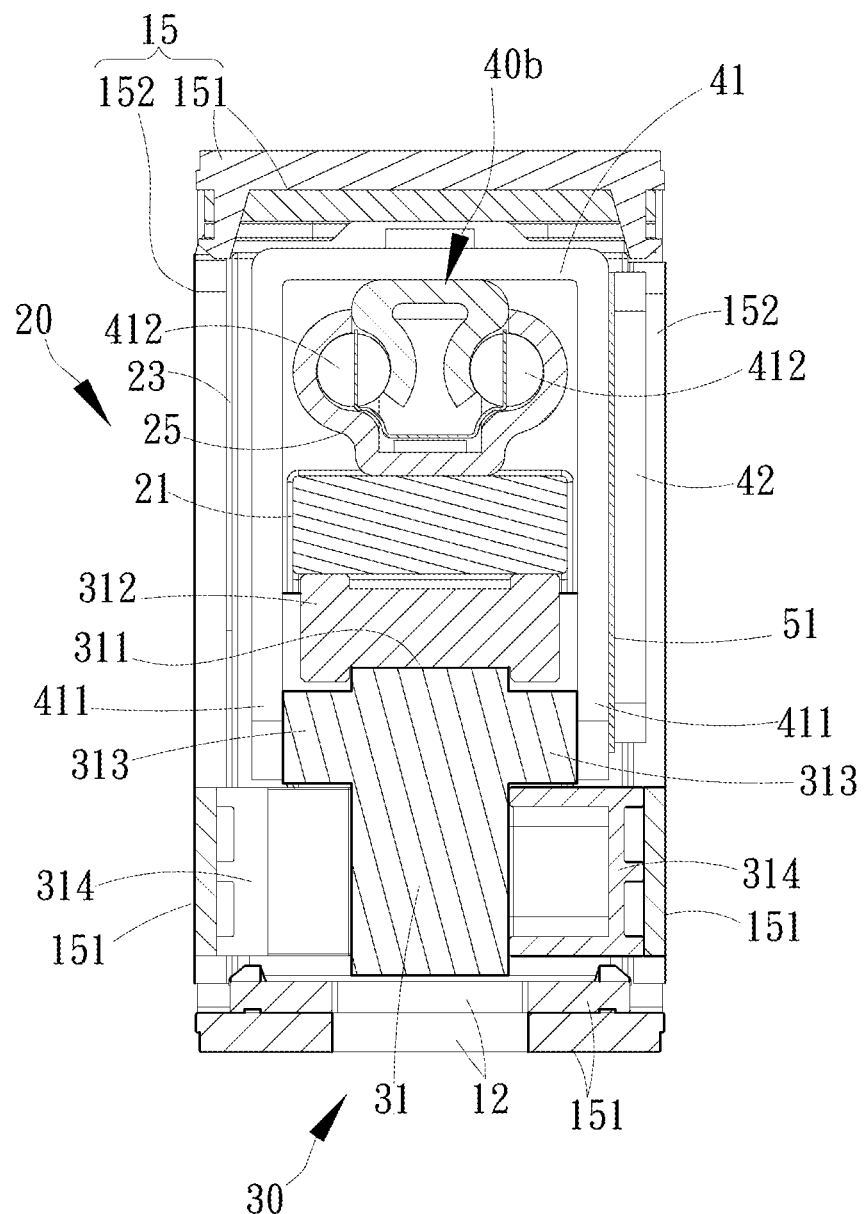
FIG. 4 is a schematic view of FIG. 3, in which the second sliding element is a slide rail with at least one second rolling member in coordination with a track in the post body of the post.
Figure 5:
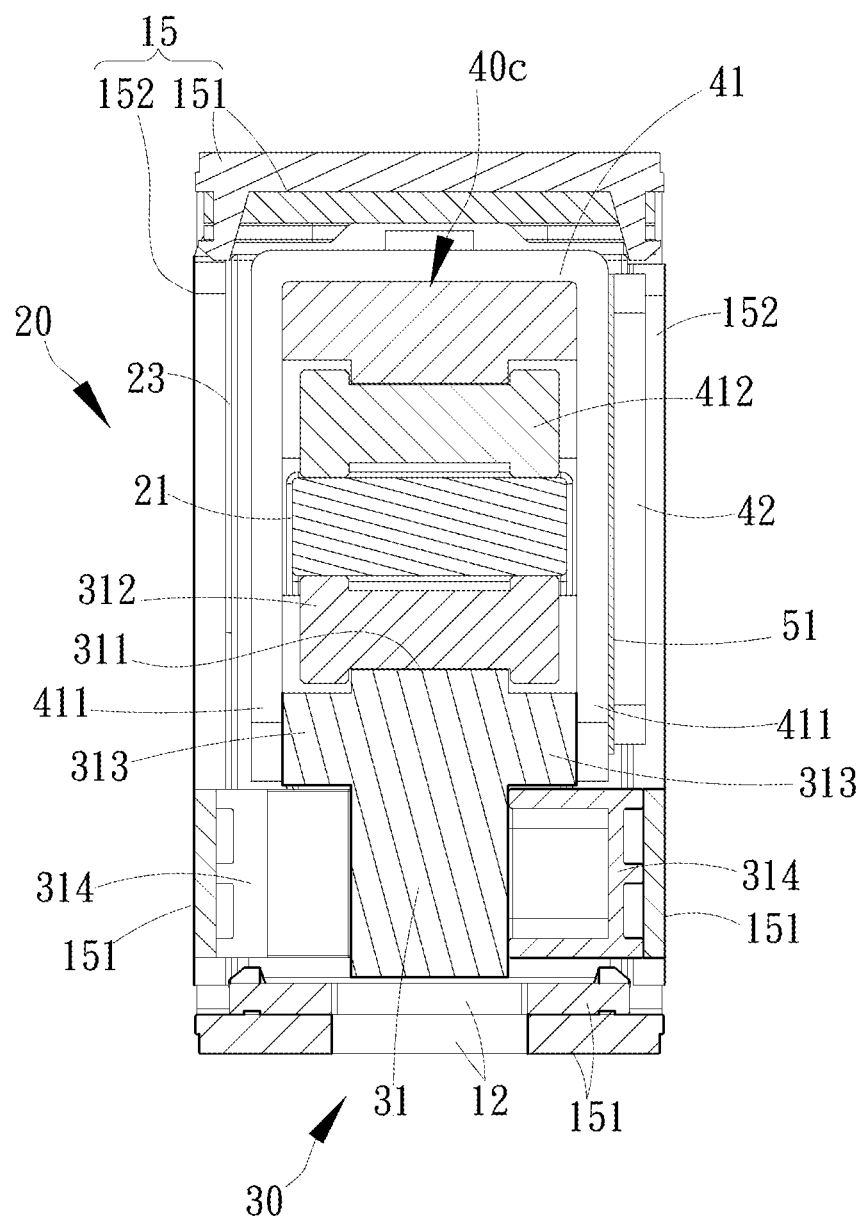
FIG. 5 is a schematic view of FIG. 3, in which the second sliding element is provided with at least one second rolling member for rolling contacting another post side of the post body of the post.
Figure 6:
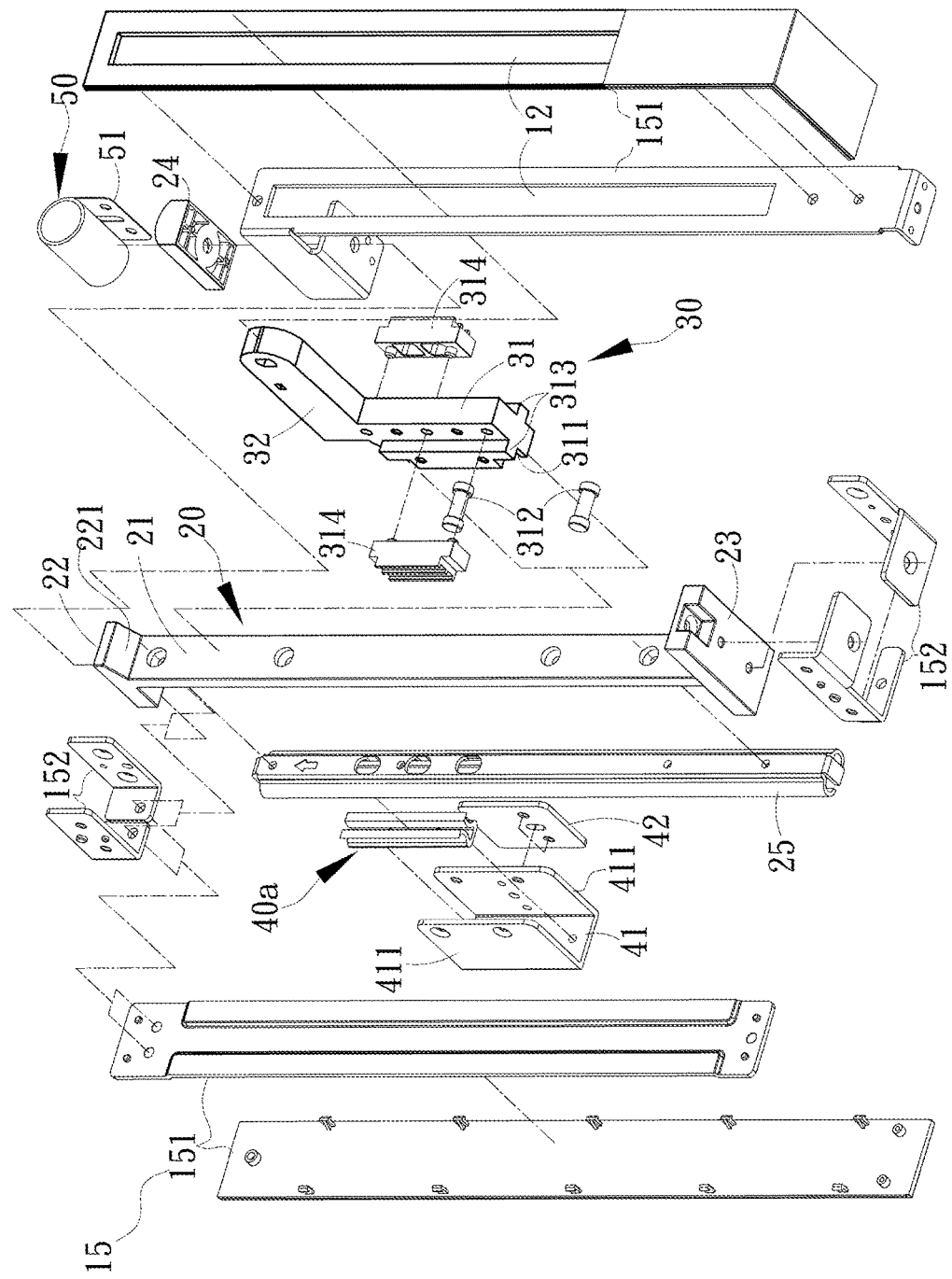
FIG. 6 is an exploded view of the lift mechanism provided by the present invention.
Figure 7:
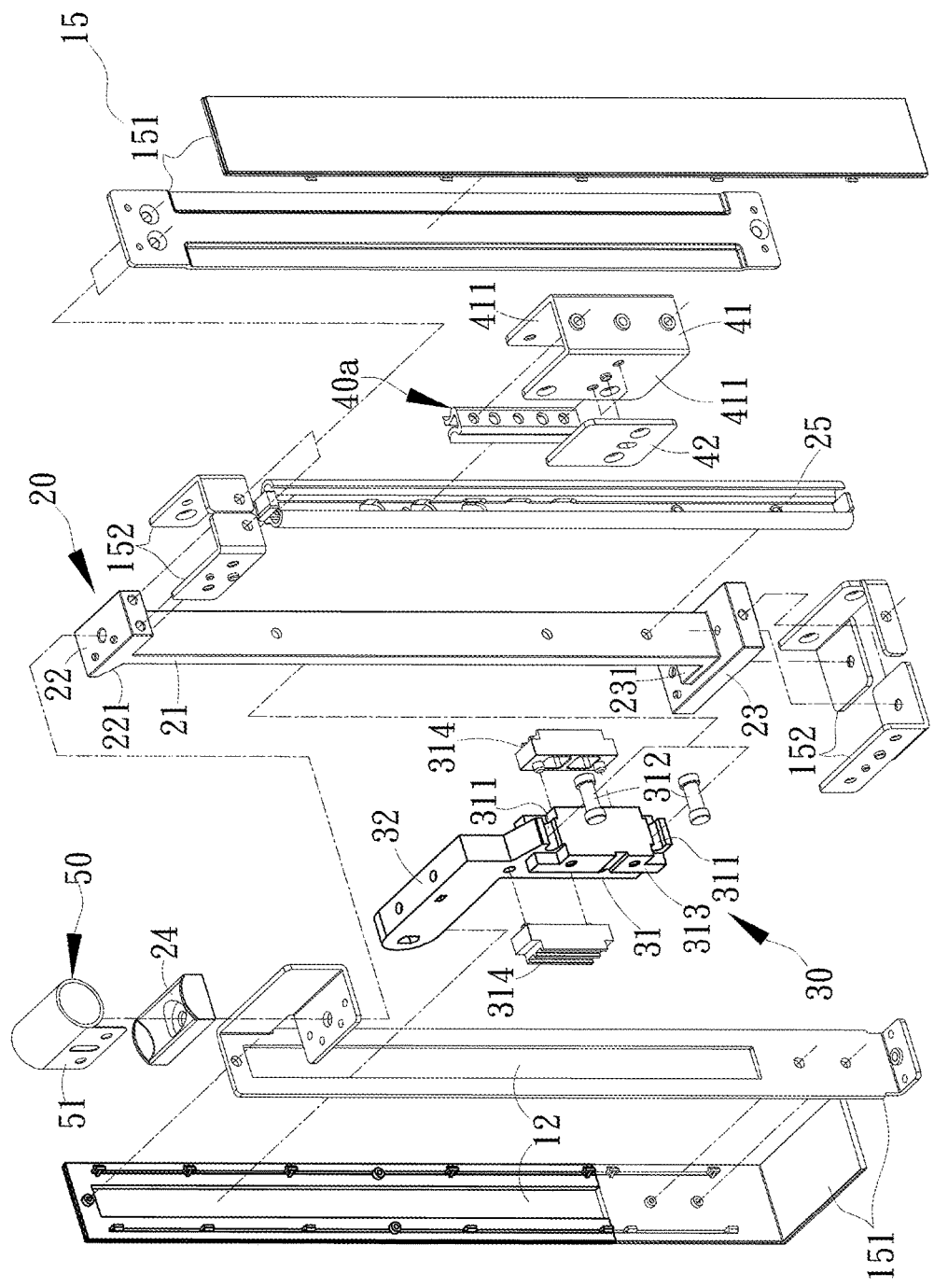
FIG. 7 is an exploded view of the lift mechanism provided by the present invention viewing from another viewpoint.
Figure 8:
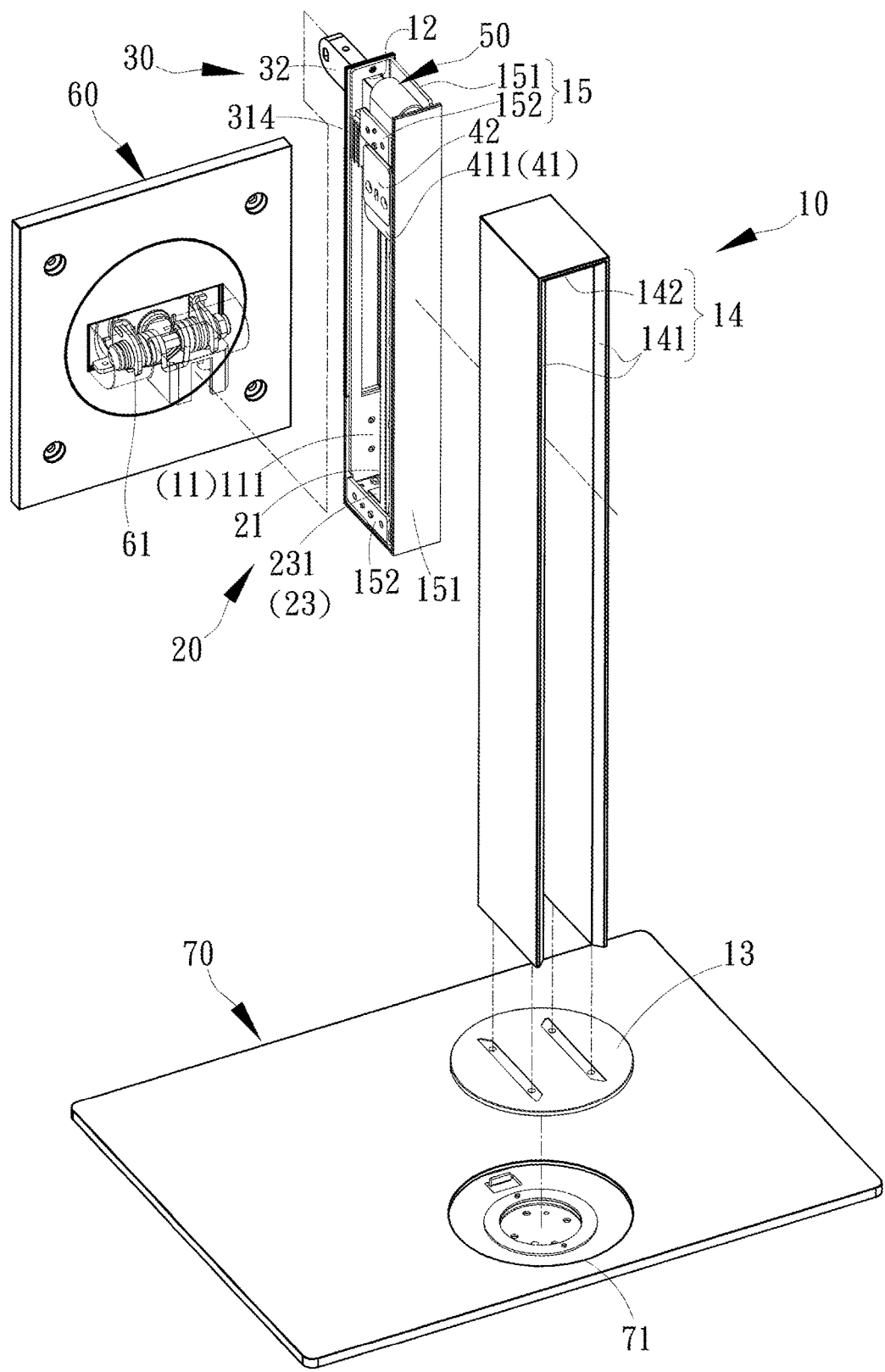
FIG. 8 is an exploded view of the thin-type supporting device provided by the present invention, in which part of the outer case of the supporting base is shown by a dash line for showing the bearing arm structure in pin connection with a hinge device.
Figure 9:
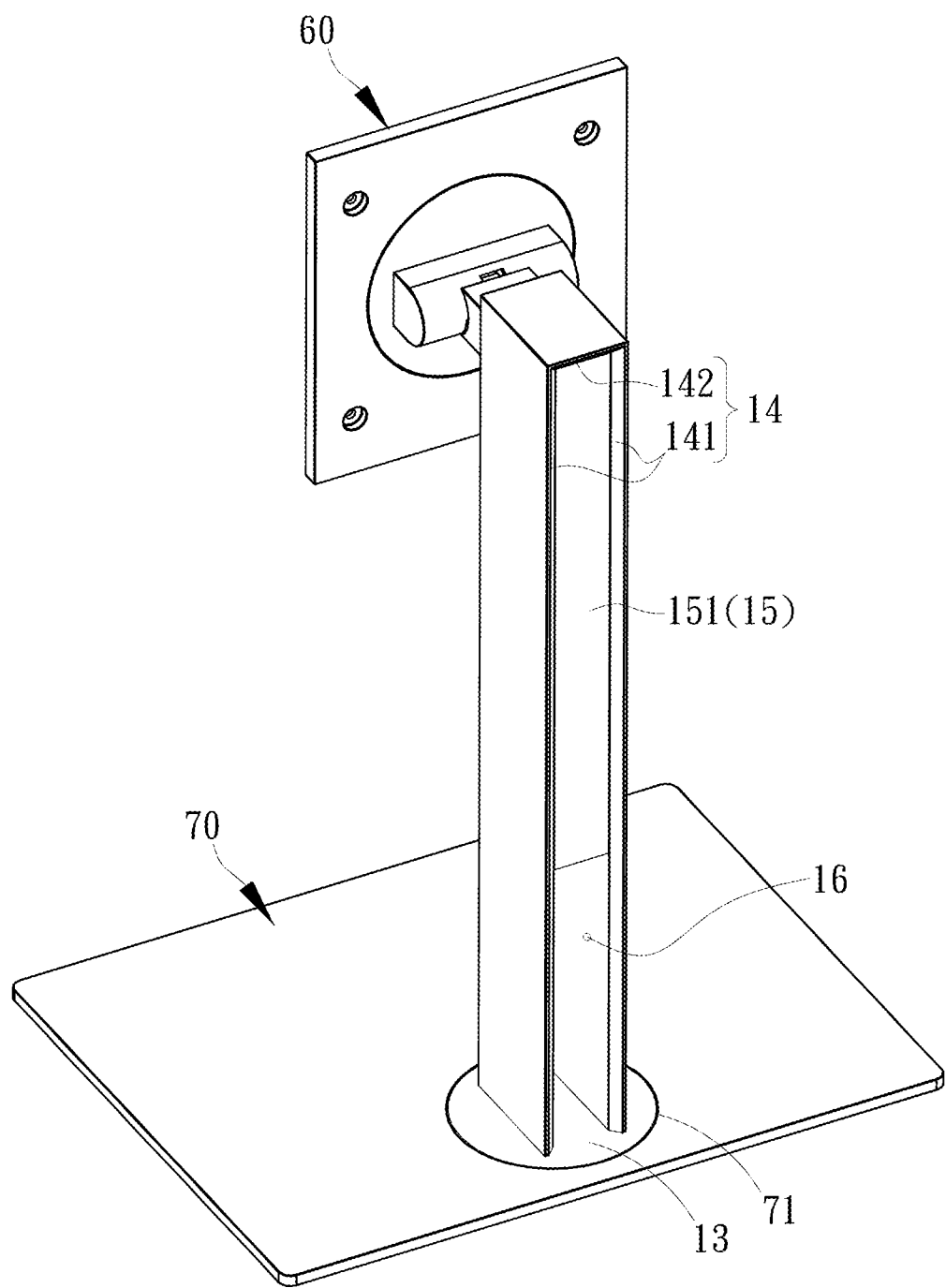
FIG. 9 is a schematic view of the assembled thin-type supporting device shown in FIG. 8.
Figure 11:
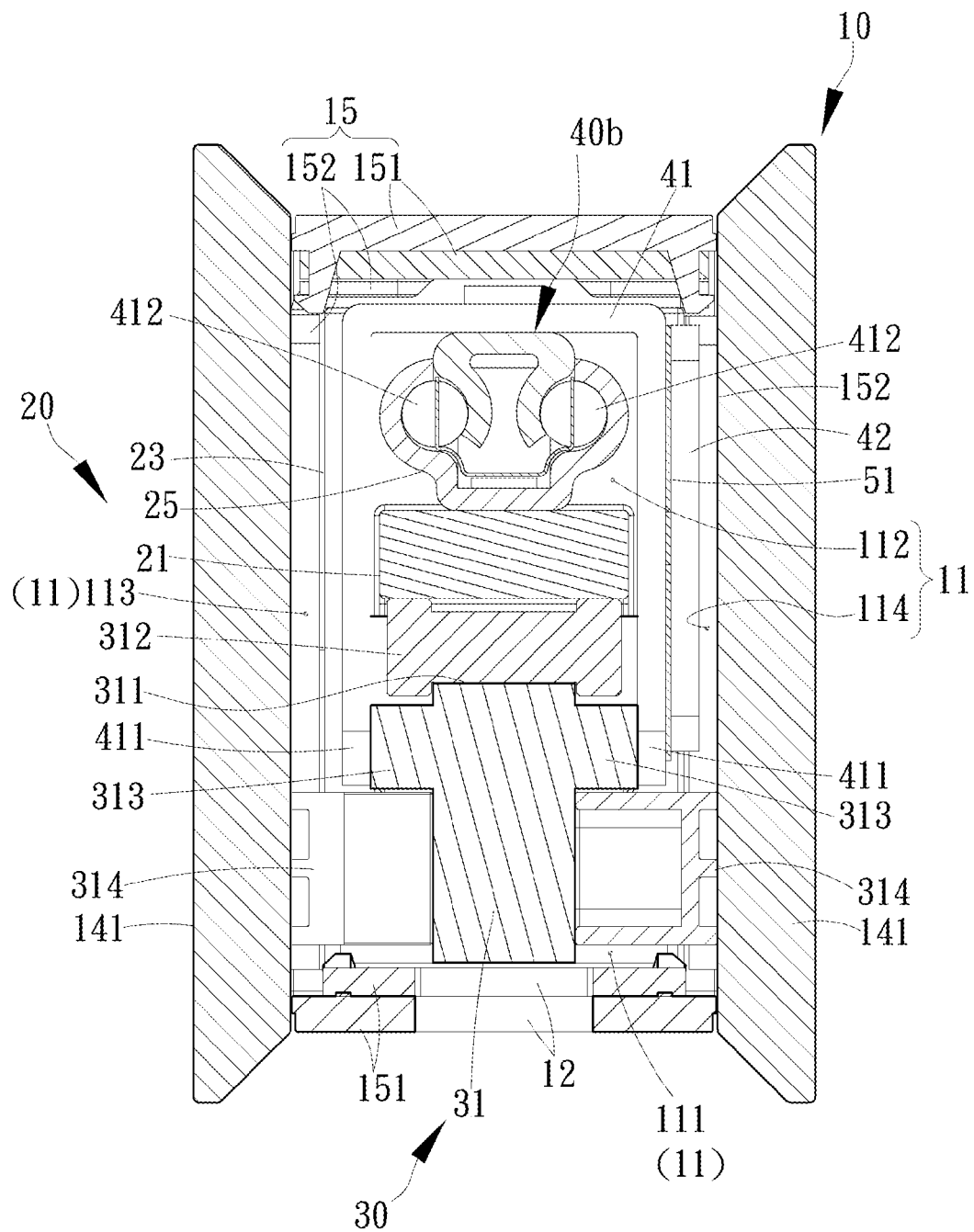
FIG. 11 is a cross-sectional top view along line BB' in FIG. 10.

Moreover, in the embodiment of the lift mechanism and the thin-type supporting device, when the first sliding element 30 is connected to the display, the second sliding elements 40a, 40b, 40c may be connected to another display optionally. Without additionally connecting to another display, the second sliding elements 40a, 40b, 40c may have a variety of designs. As shown in FIG. 5, at least one second rolling member 412 is provided to the second sliding element 40c for rolling contacting another post side of the post body 21. In this case, both the at least one second rolling member 412 and the first rolling member 312 are implemented as rollers to save the cost. Or as shown in FIG. 3, a track 25 is provided to another post side of the post body 21, and the second sliding element 40a is a slide rail sliding along the track 25 without a rolling part. In this case, the second sliding element 40a in combination with the track 25 forms a slide rail assembly without roller. Or as shown in FIGS. 5 and 11, a track 25 is provided to another post side of the post body 21, and at least one second rolling member 412 is provided to the second sliding element 40b for rolling contacting the track 25, so that the second sliding element 40b slides along the track 25. In this case, the at least one second rolling member 412 are balls, and the second sliding element 40a is a slide rail with balls and in combination with the track 25 forms a slide rail assembly with balls.

To sum up, as disclosed above, the present invention can indeed meet its anticipated object to provide a thin-type lift mechanism, and a thin-type supporting device comprising a non-casting flap-shaped support that receives and protects the lift mechanism therein. Moreover, the preferred embodiments are disclosed to meet the above object rather than limiting the structural properties of the present invention. Many equivalent local variations and modifications can still be made by those skilled at the field related with the present invention and do not depart from the spirit of the present invention, so they should be regarded to fall into the scope defined by the appended claims.

What is claimed is:

1. A thin-type supporting device having a lift mechanism, wherein the lift mechanism thereof is for lifting a display up and down, and the thin-type supporting device comprising:
   a flat-shaped support provided with a longitudinal long hole on a narrow side of a flat frame for communicating with a receiving space in the flat-shaped support, and the flat-shaped support comprising: a base plate, a case, and plural long and short connecting pieces, the long connecting pieces and short connecting pieces longitudinally bridge across and transversely line alongside the two opposite post ends of the post and each of which are fixed to inner walls of the case, so that the receiving space is formed in an upper part of the flat-shaped support, the case is formed by bending two long side plates of the same width and a short top plate, and the case is provided across the base plate with the two long side plates and forms an opening at a lower part of the flat-shaped support; and the flat-shaped support further comprises: a supporting plate and a base, a positioning groove is provided on a top of the base for embedding the base plate to make the flat-shaped support stand, a side of the supporting plate supports the display, and an opposite side of the supporting plate pin connects the first sliding element by a hinge device;
   a post fixed to two opposite end parts of the receiving space respectively with its two post ends, so that a post body of the post forms a central post;
   a first sliding element for supporting the display, one side of the first sliding element provided with at least one first rolling member for rolling contacting a post side of the post body, and the first sliding element traversing through and sliding along the longitudinal long hole;
   a second sliding element, provided at an opposite another post side of the post body and connected and fixed to the first sliding element across the post body by at least one connecting structure, so that the two sliding elements that pull each other slide respectively along at least two post sides of the post body and move coherently; and
   a constant force spring, provided at one post end of the post body, and extending an end to connect and fix to the at least one connecting structure, so that the two sliding elements that move coherently are stopped by a default elastic force.

2. The thin-type supporting device having a lift mechanism according to claim 1, wherein two longitudinal channels are partitioned from the receiving space by the post body of the post, the first sliding element is provided in one of the longitudinal channels, and the second sliding element is provided in the other longitudinal channel at the opposite post side of the post body; and two interstices are forming respectively between another two opposite post sides and each of inner walls of wide sides of the flat-shaped support for the at least one connecting structure and one end of the constant force spring to traverse through.

3. The thin-type supporting device having a lift mechanism according to claim 1, wherein the first sliding element is flat-shaped and comprises a block structure and a bearing arm structure connected with each other as an integral, the bearing arm structure traverses through and slides along the longitudinal long hole, and the block structure has a narrow side facing the post body of the post, and the narrow side is provided with at least one groove for disposing the at least one first rolling member.

4. The thin-type supporting device having a lift mechanism according to claim 3, wherein the two opposite post ends of the post respectively form a first beam and a second beam, one side of the block structure contacts an inclined plane of the first beam to stop moving up, or the other side of the block structure contacts an stage of the second beam to stop moving down.

5. The thin-type supporting device having a lift mechanism according to claim 2, wherein the first sliding element has two opposite wide sides, a terrace rises on each of the wide sides respectively, and each of the wide sides is provided with a friction member, and the second sliding element is provided with a detachable engaging piece, the at least one connecting structure are two connecting wings bending respectively from two opposite sides of the engaging piece, and each of the at least one connecting structure crosses the interstices of the post body of the post to connect and fix respectively to one of the terraces of the first sliding element, and each of the friction member butts against and frictionally contacts the inner walls of the wide sides of the flat-shaped support respectively.

6. The thin-type supporting device having a lift mechanism according to claim 2, wherein one post end of the post is provided with a spring retainer for receiving the constant force spring, and one end of the constant force spring and one terrace of the first sliding element are connected and fixed respectively to two opposite faces of one of the connecting structure, a fixing piece is provided to clamp the end of the constant force spring with the connecting structure.

7. The thin-type supporting device having a lift mechanism according to claim 5, wherein one post end of the post is provided with a spring retainer for receiving the constant force spring, and one end of the constant force spring and one terrace of the first sliding element are connected and fixed respectively to two opposite faces of one of the connecting structure, a fixing piece is provided to clamp the end of the constant force spring with the connecting structure.

8. The thin-type supporting device having a lift mechanism according to claim 2, wherein the flat-shaped support further comprises: a base plate, a case, and plural long and short connecting pieces, the long connecting pieces and short connecting pieces longitudinally bridge across and transversely line alongside the two opposite post ends of the post and each of which are fixed to inner walls of the case, so that the receiving space is formed in an upper part of the flat-shaped support, the case is formed by bending two long side plates of the same width and a short top plate, and the case is provided across the base plate with the two long side plates and forms an opening at a lower part of the flat-shaped support; and the flat-shaped support further comprises: a supporting plate and a base, a positioning groove is provided on a top of the base for embedding the base plate to make the flat-shaped support stand, a side of the supporting plate supports the display, and an opposite side of the supporting plate pin connects the first sliding element by a hinge device.

9. The thin-type supporting device having a lift mechanism according to claim 1, wherein at least one second rolling member is provided to the second sliding element for rolling contacting another post side of the post body.

10. The thin-type supporting device having a lift mechanism according to claim 2, wherein at least one second rolling member is provided to the second sliding element for rolling contacting another post side of the post body.

11. The thin-type supporting device having a lift mechanism according to claim 1, wherein a track is provided to another post side of the post body, and the second rolling member is a slide rail sliding along the track without a rolling part.

12. The thin-type supporting device having a lift mechanism according to claim 2, wherein a track is provided to another post side of the post body, and the second rolling member is a slide rail sliding along the track without a rolling part.

13. The thin-type supporting device having a lift mechanism according to claim 1, wherein a track is provided to another post side of the post body, and at least one second rolling member is provided to the second sliding element for rolling contacting the track, so that the second sliding element slides along the track.

14. The thin-type supporting device having a lift mechanism according to claim 2, wherein a track is provided to another post side of the post body, and at least one second rolling member is provided to the second sliding element for rolling contacting the track, so that the second sliding element slides along the track.

* * * * *